(12) United States Patent
Graves

(10) Patent No.: US 11,419,310 B2
(45) Date of Patent: Aug. 23, 2022

(54) LIVESTOCK FEEDER

(71) Applicant: AmeriAg, LLC, Burlington, NC (US)

(72) Inventor: Travis Graves, Burlington, NC (US)

(73) Assignee: AmeriAg, LLC, Burlington, NC (US)

( * ) Notice: Subject to any disclaimer, the term of this patent is extended or adjusted under 35 U.S.C. 154(b) by 194 days.

(21) Appl. No.: 16/578,462

(22) Filed: Sep. 23, 2019

(65) Prior Publication Data

US 2020/0093094 A1    Mar. 26, 2020

Related U.S. Application Data

(60) Provisional application No. 62/734,304, filed on Sep. 21, 2018.

(51) Int. Cl.
  *A01K 5/02*    (2006.01)
  *A01K 5/01*    (2006.01)

(52) U.S. Cl.
  CPC .......... *A01K 5/0225* (2013.01); *A01K 5/0107* (2013.01)

(58) Field of Classification Search
  CPC ....... A01K 5/0225; A01K 5/0107; A01K 5/01
  See application file for complete search history.

(56) References Cited

U.S. PATENT DOCUMENTS

| | | | | |
|---|---|---|---|---|
| 2,974,633 A | * | 3/1961 | Howell | A01K 5/0225 119/51.01 |
| 5,794,561 A | * | 8/1998 | Schulz | A01K 5/0225 119/52.1 |
| D924,491 S | | 7/2021 | Graves | |
| 2007/0163505 A1 | * | 7/2007 | Lynch | A01K 39/012 119/52.1 |
| 2010/0307421 A1 | * | 12/2010 | Gates | A01K 39/012 119/56.1 |
| 2016/0088817 A1 | | 3/2016 | Priefert | |
| 2016/0366851 A1 | | 12/2016 | Elias | |
| 2017/0055492 A1 | | 3/2017 | Lowenthal | |

FOREIGN PATENT DOCUMENTS

| | | | |
|---|---|---|---|
| CA | 3056082 A1 | 3/2020 | |
| CA | 190036 | 3/2021 | |
| WO | WO-2008123653 A1 * | 10/2008 | ........... A01K 5/0225 |

OTHER PUBLICATIONS

Office Action corresponding to U.S. Appl. No. 29/706,652 dated Dec. 31, 2020.
Office Action corresponding to Canadian Design Application No. 190036 dated Jan. 20, 2021.
Notice of Allowance corresponding to U.S. Appl. No. 29/706,652 dated Apr. 14, 2021.

(Continued)

*Primary Examiner* — Joshua J Michener
*Assistant Examiner* — Nicole Paige MacCrate
(74) *Attorney, Agent, or Firm* — Jenkins, Wilson, Taylor & Hunt, P.A.

(57) ABSTRACT

Livestock feeders are provided. A livestock feeder can include a base, hopper and lid. The livestock feeder is suitable for providing feedstuffs such as nutritional supplements to a livestock animal on a free-choice basis. The livestock feeder can be durable, portable, non-corrosive and is designed to minimize spillage of feedstuffs and resist tipping over. The livestock feeder can be constructed from a molded polyethylene material.

19 Claims, 14 Drawing Sheets

(56) References Cited

OTHER PUBLICATIONS

Interview Summary corresponding to U.S. Appl. No. 29/706,652 dated Dec. 8, 2020.
Office Action corresponding to U.S. Appl. No. 29/706,652 dated Aug. 6, 2020.
Notice of Allowability corresponding to U.S. Appl. No. 29/706,652 dated Jun. 4, 2021.

* cited by examiner

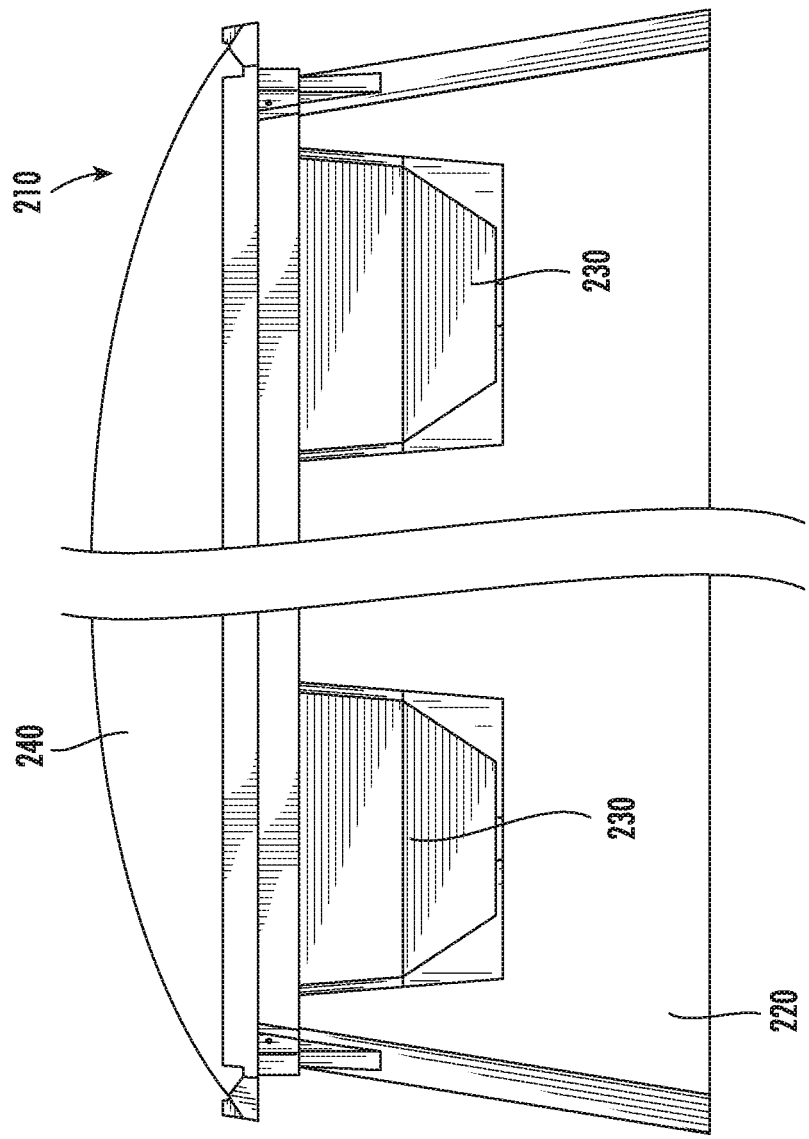

LIVESTOCK FEEDER

CROSS-REFERENCE TO RELATED APPLICATIONS

This application claims the benefit of and priority to U.S. Provisional Application No. 62/734,304 filed Sep. 21, 2018, the entire disclosure of which is herein incorporated by reference.

TECHNICAL FIELD

This presently disclosed subject matter relates to a livestock feeder. More specifically, the presently disclosed subject matter is directed to a livestock feeder suitable for providing nutritional supplements and/or feedstuffs to cattle and other livestock species. The disclosed livestock feeder is designed to be durable, portable and able to resist being tipped over by livestock.

BACKGROUND

The livestock industry utilizes supplemental feeding to meet the nutritional needs of livestock, particularly grazing livestock such as cattle, sheep, goats, horses, bison and the like. Minerals, vitamins, salts and other nutrients are often provided to livestock as a supplement to their basal diet. For example, in an effort to optimize nutritional balance, grazing cattle are often provided with trace mineral and vitamin supplements to compensate for nutrient deficiencies in the grazing animal's diet. While they can be mixed with feed, supplements of this nature are often provided to livestock on an ad libitum or free-choice basis, particularly with grazing livestock.

In order to make such supplements available to livestock on a free-choice basis the supplements are typically provided in free-standing feeders that are readily accessible to the livestock animals. Current feeders on the market, often referred to as "mineral feeders" in the livestock industry, suffer from numerous disadvantages and weaknesses, with the primary weaknesses being durability, portability and spill prevention. Moreover, there is a need for such feeders that have a large holding capacity that allows for multiple animals to feed simultaneously and still keep the feedstuff dry. As such, a need exists for a livestock feeder that is durable, portable large capacity, accessible by multiple animals, and resists spillage, while being suitable for providing livestock with such nutritional supplements.

SUMMARY

It is an object of the presently disclosed subject matter to provide novel livestock feeders.

In some embodiments, provided herein are livestock feeders comprising a base portion comprising a plurality of separated feeding compartments radiating from a centermost point, a hopper component comprising a plurality of separated hopper compartments radiating from a centermost point and corresponding to the plurality of separated feeding compartments, and a lid component comprising a substantially planar member positioned above the base portion and/or hopper component. In some aspects, the base portion comprises a plurality of access openings adjacent to each of the plurality of separated feeding compartments, wherein each of the plurality of access openings are of a size sufficient to permit livestock to access each of the separated feeding compartments by passing an animal head therethrough. In some aspects, the base portion further comprises a plurality of upright support posts configured to engage and support the hopper component and/or the lid component. In some embodiments, the hopper component and/or the lid component aligns with and is supported by the upright support posts.

In some embodiments, the base portion comprises vertical divider components forming inner walls of the plurality of separated feeding components. In some embodiments, the hopper component comprises recessed portions disposed between the plurality of separated hopper compartments and configured to slidingly engage the vertical divider components of the base, wherein the hopper component is configured to nest within the base and hold feed or mineral. In some embodiments, the hopper component comprises a first opening at a top end, wherein the hopper component comprises a plurality of substantially vertical sides, wherein the first opening and plurality of substantially vertical sides define an interior space configured to hold a feedstuff. In some embodiments, the plurality of separated hopper compartments extend below the interior space of the hopper component, wherein the plurality of separated hopper compartments are defined by a plurality of side walls extending from the plurality of substantially vertical sides of the hopper component and the recessed portions disposed between the separated hopper compartments.

In some embodiments, the plurality of side walls of the plurality of separated hopper components extend substantially vertically and inwardly tapered from the plurality of substantially vertical sides of the hopper component. In some embodiments, each of the plurality of separated hopper components terminates in a second opening. In some embodiments, the one or more hopper compartments are configured to hold a feedstuff, wherein the feedstuff is gravity fed into the one or more feeding compartments in the base.

In some embodiments, the hopper component comprises one or more adjustable doors. In some embodiments, the one or more adjustable doors is adjustably affixed to at least one of the plurality of separated hopper compartments, wherein the adjustable doors are configured to control the flow of feedstuffs from the hopper compartment to the adjoining feeding compartment. In some embodiments, the one or more adjustable doors comprise one or more slots and one or more adjustable attachment components, wherein the one or more adjustable doors are configured to slidably attach to at least one of the side walls of the plurality of separated hopper components, wherein the one or more adjustable doors are configured to slidably move in a substantially vertical direction with respect to the side wall of the separated hopper component to thereby change a dimension of the second opening.

In some embodiments, the lid component is detachably secured to one or more of the plurality of upright support posts, wherein the lid component comprises a downward sloping curvature from a centermost point, wherein the lid component comprises a lip extending substantially around an outermost edge.

In some embodiments, a feeder can further comprise a divider insertable in the hopper component and extending above the plurality of separated hopper compartments. In some embodiments, the base portion further comprises a recessed circular portion on an underside thereof having a circular opening with a diameter substantially similar to the diameter of the outer periphery of a tire. In some embodiments, the recessed circular portion of the base is configured to receive a tire, wherein the base is configured to rest on the tire, wherein the base portion is an anti-tipping mechanism to maintain the feeder in an upright position, wherein the tire improves portability. In some embodiments, the base portion, hopper component and lid component are constructed as molded composites comprising a polyethylene material.

In some embodiments, provided herein is a livestock feeder system comprising a base portion comprising a plurality of separated feeding compartments radiating from a centermost point, wherein the base is configured to rest on the tire, wherein the base portion is an anti-tipping mechanism to maintain the feeder in an upright position, a hopper component comprising a plurality of separated hopper compartments radiating from a centermost point and corresponding to the plurality of separated feeding compartments, wherein the hopper component comprises one or more adjustable doors, wherein the adjustable doors are configured to control the flow of feedstuffs from the hopper compartment to the adjoining feeding compartment, and a lid component comprising a substantially planar member positioned above the base portion and/or hopper component.

An object of the presently disclosed subject matter having been stated hereinabove, and which is achieved in whole or in part by the presently disclosed subject matter, this and other objects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which:

FIG. 13 is a front elevation view of a livestock feeder with a plurality of feeding compartments on each side.

DETAILED DESCRIPTION

Figure 1:
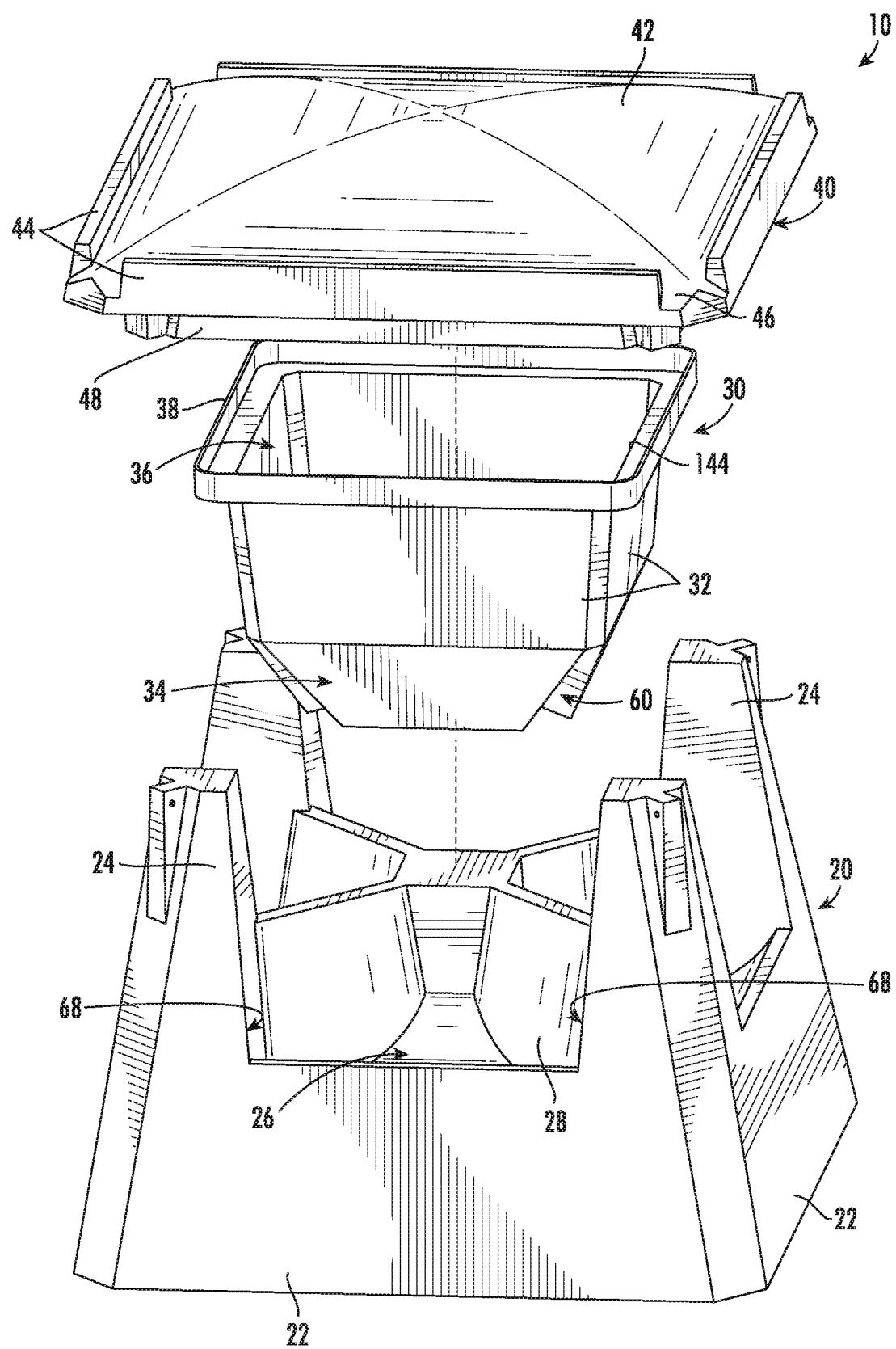
FIG. 1 is a perspective exploded view of a livestock feeder in accordance with the subject matter herein.

The subject matter disclosed herein provides livestock feeders. In some aspects or embodiments, the disclosed livestock feeders are suitable for providing nutritional supplements and other feedstuffs to various livestock species. A livestock feeder in accordance with the disclosure herein is designed to be durable, portable and resist being tipped over by livestock. Moreover, a livestock feeder in accordance with the disclosure herein is designed to efficiently provide nutritional supplements to livestock while minimizing spillage and waste.

The livestock industry utilizes supplemental feeding to meet the nutritional needs of livestock, particularly grazing livestock such as cattle, sheep, goats, horses, bison and the like. Minerals, vitamins, salts and other nutrients are often provided to livestock as a supplement to their basal diet. For example, in an effort to optimize nutritional balance, grazing cattle are often provided with trace mineral and vitamin supplements to compensate for nutrient deficiencies in the grazing animal's diet. While they can be mixed with feed, supplements of this nature are often provided to livestock on an ad libitum or free-choice basis, particularly with grazing livestock. In some instances, this method is preferred because it can reduce labor costs, thereby making it a more economical and convenient approach.

In order to make such supplements available to livestock on a free-choice basis, the supplements are typically provided in free-standing feeders that are freely accessible and/or readily available to the animals. Current feeders on the market, often referred to as "mineral feeders" in the livestock industry, suffer from numerous disadvantages and weaknesses, with the primary weaknesses being durability, portability and spill prevention. Currently available mineral feeders are often insufficiently designed to withstand long-term exposure to environmental elements and physical wear and tear from use by livestock. Currently available feeders often contain parts made of metal that is highly corrosive, particularly when in contact with salts and other minerals used in feedstuffs. Indeed, a common problem with existing mineral feeders is the inability to prevent spillage of the supplements or feedstuffs contained therein when used by livestock. As such, the presently disclosed subject matter provides a livestock feeder that addresses these long-felt needs; namely a livestock feeder that is durable, portable and resists spillage, while being suitable for providing livestock with nutritional supplements.

I. Definitions

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a fastener" includes a plurality of such fasteners, and so forth.

Unless otherwise indicated, all numbers expressing quantities, units of measure, and so forth used in the specification and claims are to be understood as being modified in all instances by the terms "about", "approximately" and "substantially". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to a weight, volume, distance, measurement, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate with respect to the disclosed subject matter.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the terms "feeder", "livestock feeder" and "mineral feeder" are used interchangeably and refer to an apparatus for providing a feed, feedstuff or supplement to an animal.

The terms "feed", "feedstuff", "nutritional component", "supplement" and "nutritional supplement" are used interchangeably throughout and refer to food to be consumed by animals such as livestock, and which can be provided in the disclosed feeder.

As used herein, the terms "free-choice" and "ad libitum" are used interchangeably and refer to a means of providing feedstuff or supplement to livestock in a manner that allows animals free access to the feedstuff or supplement thereby allowing the animals to self-regulate intake according to biological needs.

II. Livestock Feeder

Figure 2:
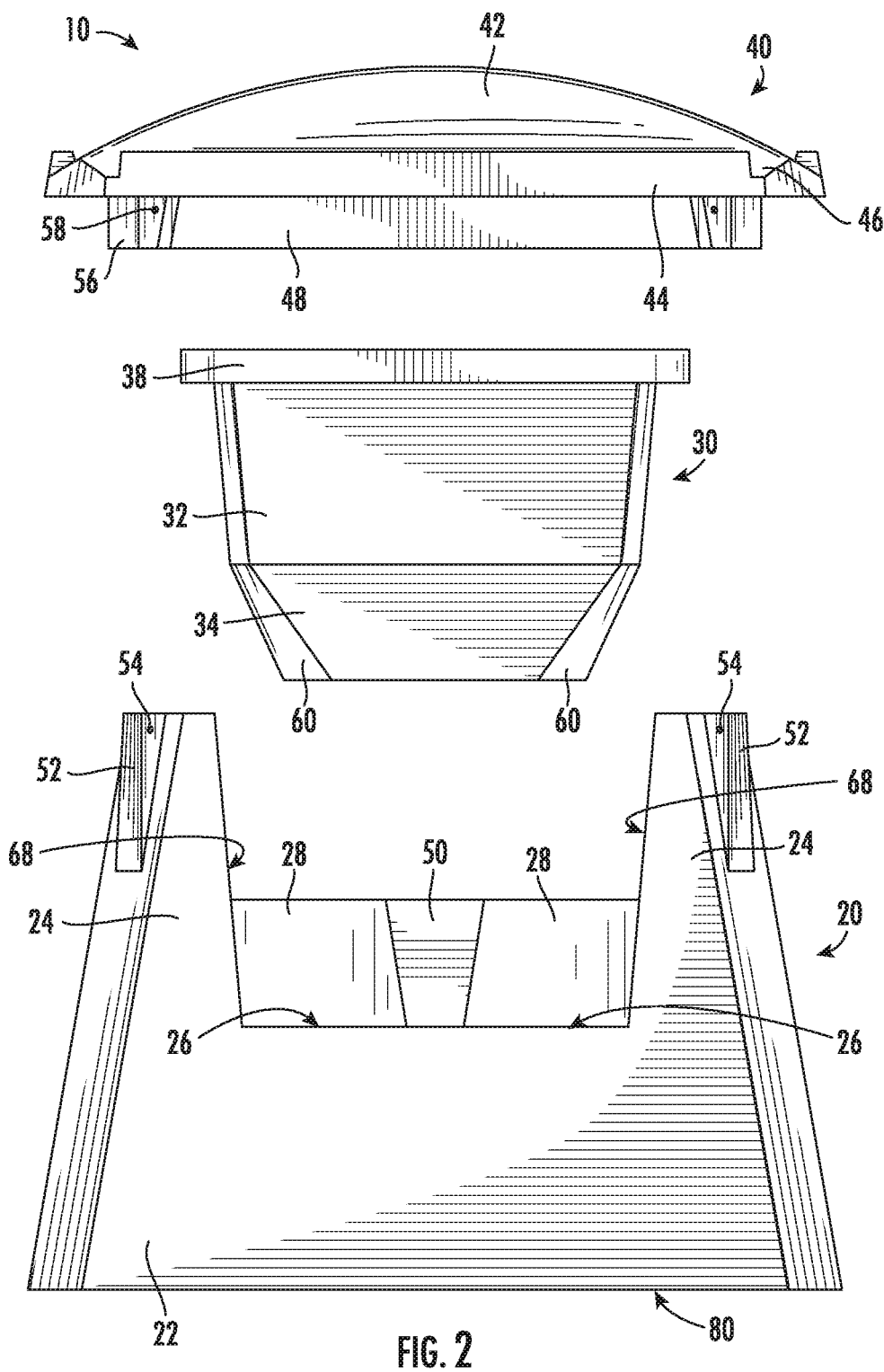
FIG. 2 is a front elevation exploded view of a livestock feeder in accordance with the subject matter herein.
Figure 3:
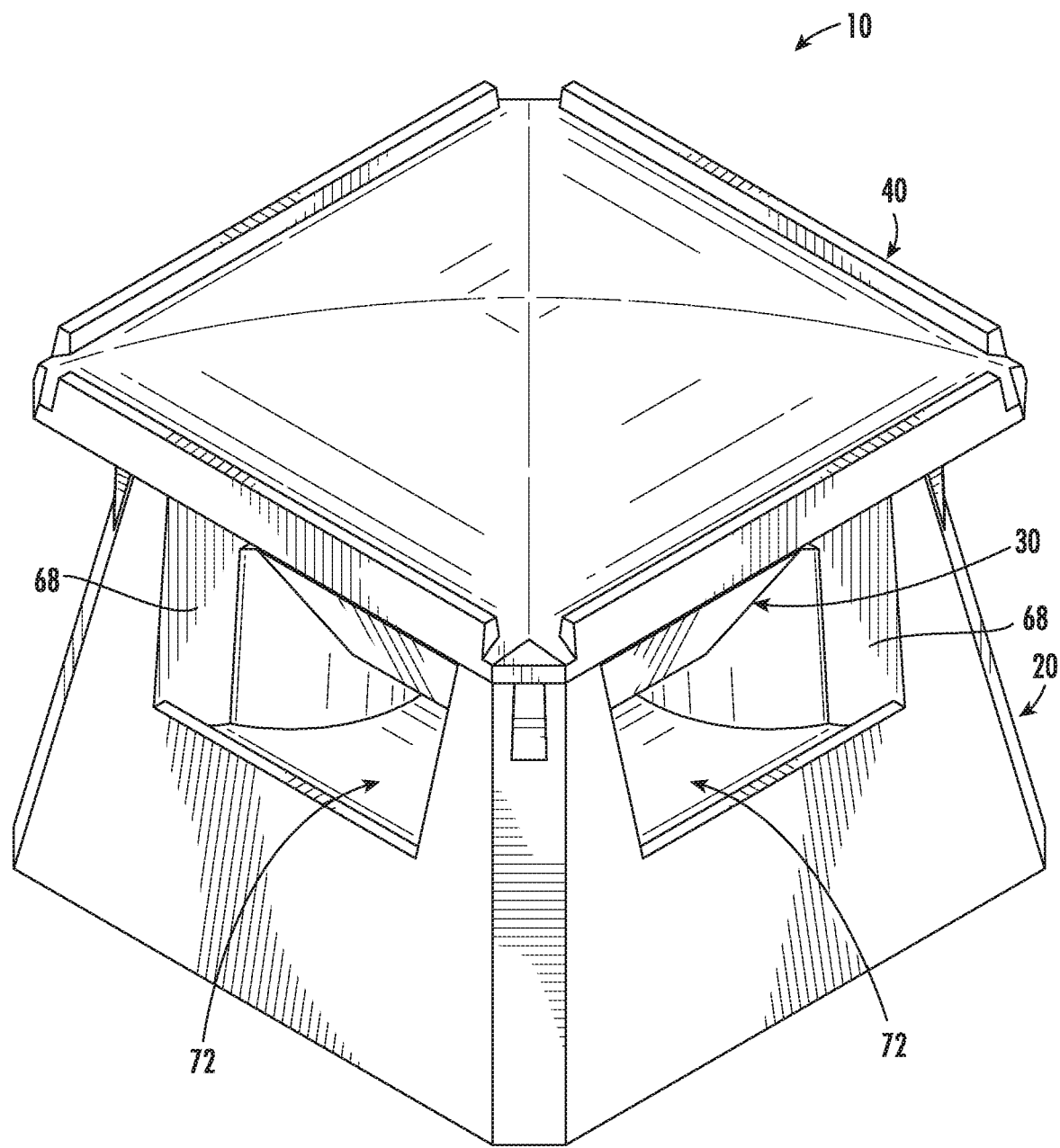
FIG. 3 is a perspective view of a livestock feeder in an assembled condition in accordance with the subject matter herein.

Turning now to the figures, in some embodiments, the disclosed livestock feeder can generally comprise a molded feeding apparatus with a substantially trapezoid, wedge and/or pyramid design with solid sides and an anti-tip base, e.g. the octagonal or trapezoidal shape of the base resists tipping. In some aspects, and as shown in FIGS. 1-3, for example, such a feeder can be considered or referred to as a "quad feeder". As shown in FIGS. 1-3, livestock feeder 10 can comprise a base portion 20 comprising a plurality of separated feeding compartments 26 radiating from a centermost point 50, a hopper component 30 comprising a plurality of separated hopper compartments 34 radiating from a centermost point 140 and corresponding to the plurality of separated feeding compartments 26, and a lid component 40 comprising a substantially planar member positioned above the base portion 20 and/or hopper component 30, as shown for example in FIGS. 1 to 3. In some aspects, base portion 20 can comprise a plurality of access openings 68 adjacent to each of the plurality of separated feeding compartments 26, wherein each of the plurality of access openings 68 can of a size sufficient to permit livestock to access each of the separated feeding compartments 26 by passing an animal head therethrough. For example, a bottom width of access openings 68 can be about 15 inches to about 30 inches, a top width about 15 inches to about 30 inches, a center height about 10 inches to about 30 inches, and edge heights about 10 inches to about 30 inches. By way of example and not limitation, a bottom width of access openings 68 can be about 22⅝ inches, a top width about 25⅜ inches, a center height about 17½ inches, and edge heights about 14¾ inches. In some aspects, the base portion 20 can further comprise a plurality of upright support posts 24 configured to engage and support the hopper component 30 and/or the lid component 40, wherein in an assembled condition the hopper component 30 and/or the lid component 40 aligns with and is supported by the upright support posts 24.

In some embodiments, the base portion 20 can comprise at least four upright support posts 24, wherein the upright support posts 24 are positioned on an outer perimeter of the base portion 20 and extending from sides 22 of base portion 20. The upright support posts 24 can extend vertically above the separated feeding compartments 26, and at least partially define an outer perimeter of the plurality of access openings 68. By way of example, and not intended to be a limitation, in some embodiments the base portion 20, hopper component 30 and lid component 40 can comprise a substantially square outer shape, as shown in FIGS. 1 through 3.

Figure 4:
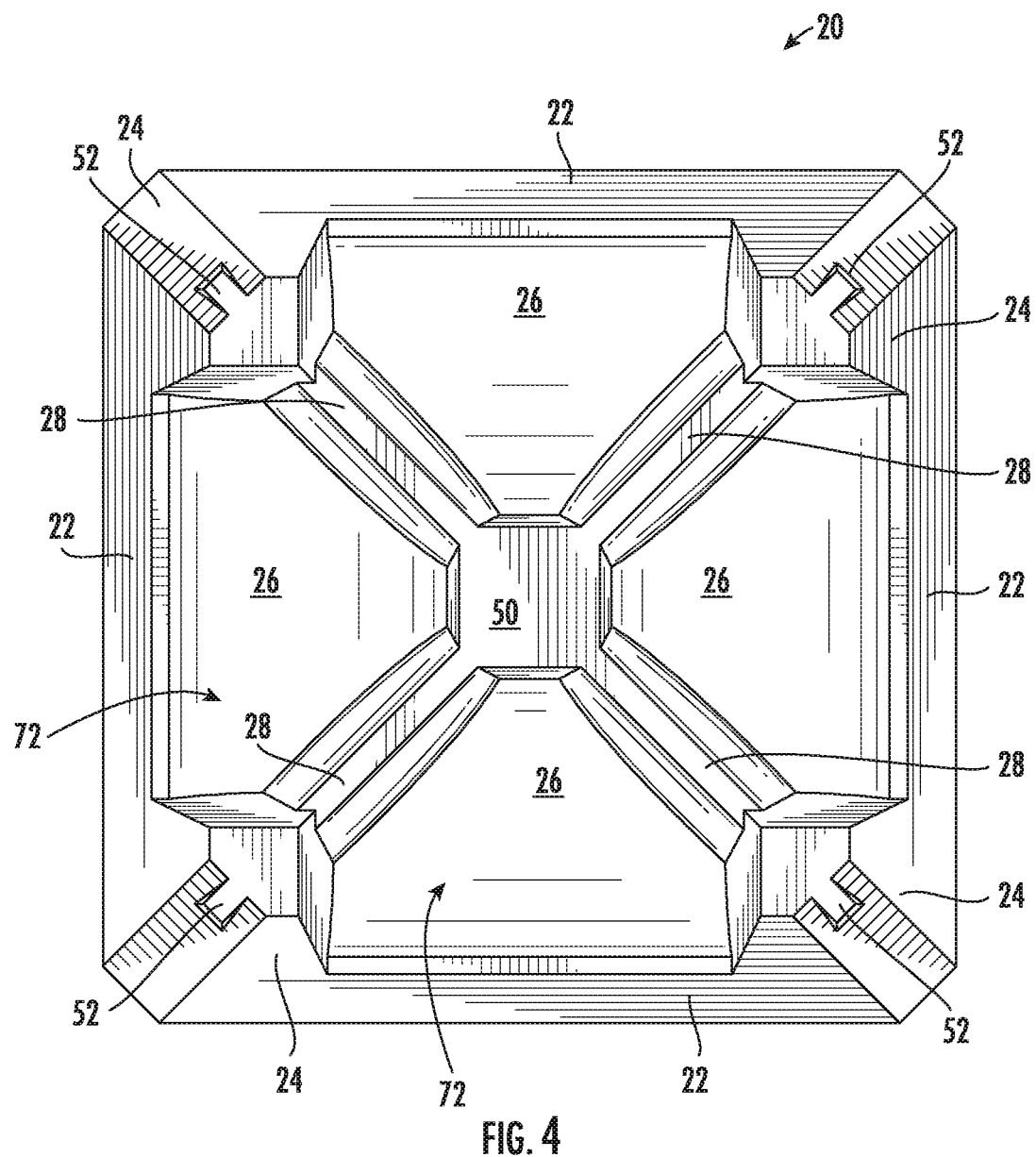
FIG. 4 is a top plan view of a base portion of a livestock feeder in accordance with the subject matter herein.
Figure 5:
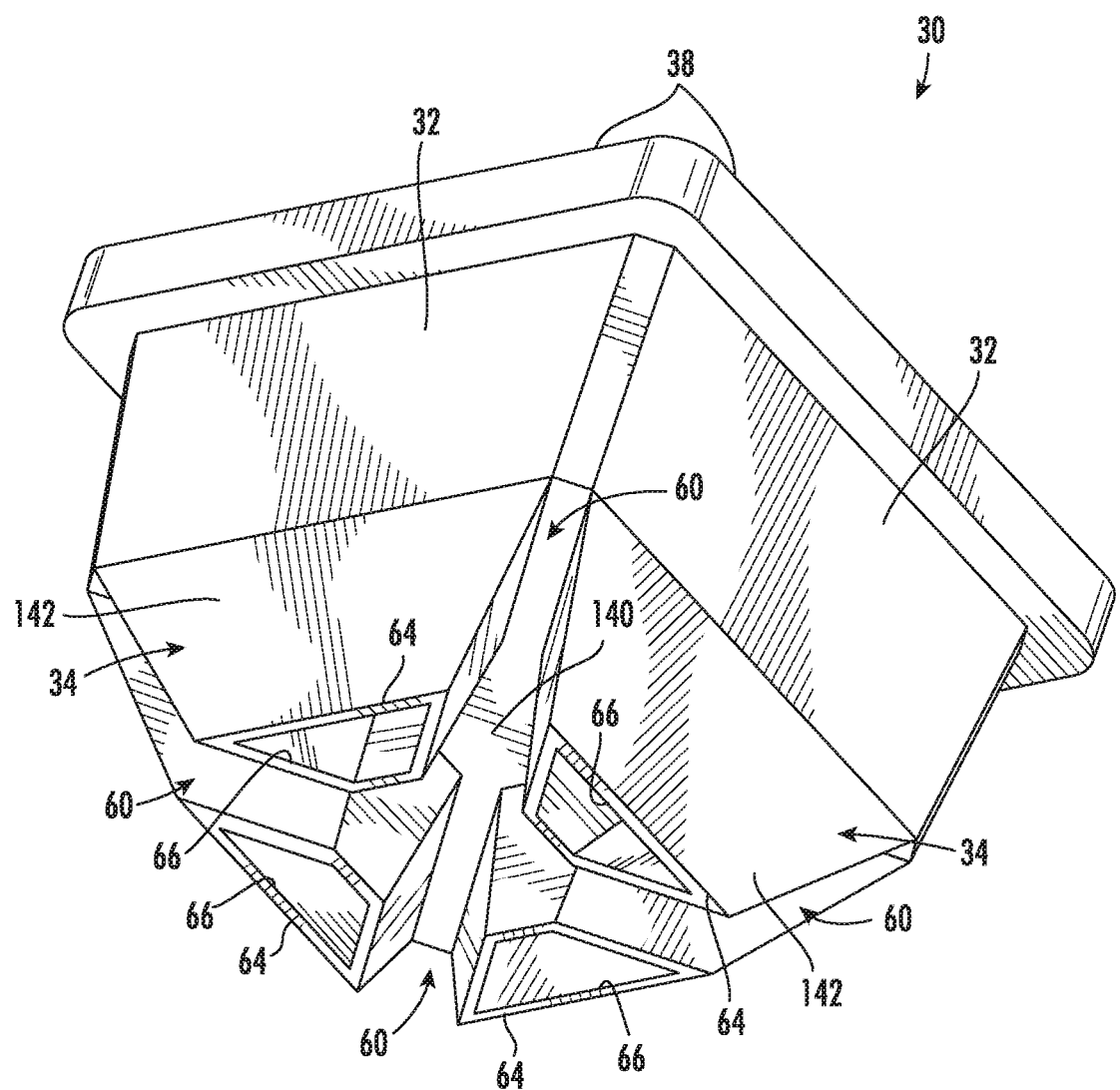
FIG. 5 is a perspective view of a hopper component of a livestock feeder in accordance with the subject matter herein.
Figure 12:
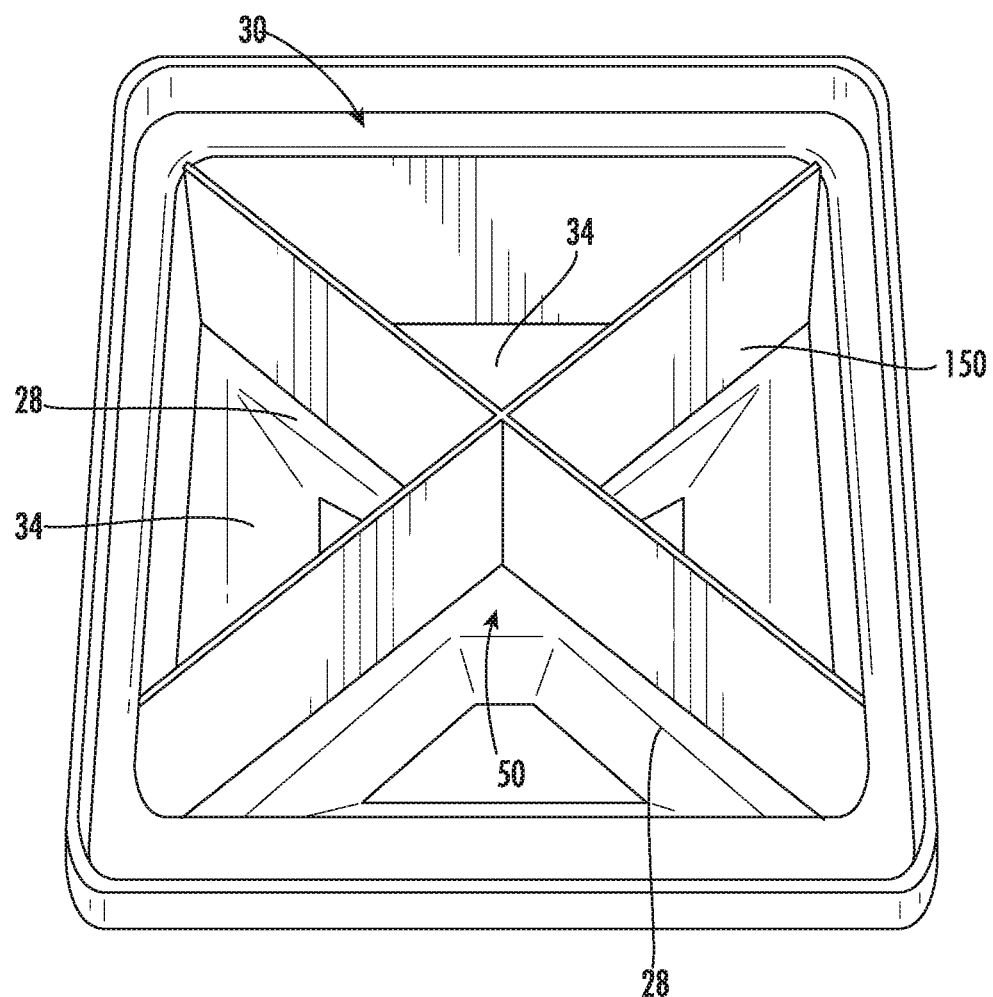
FIG. 12 is a close-up perspective view of a hopper component of a livestock feeder with optional divider in accordance with the subject matter herein.

Turning to FIGS. 1, 2 and 4, base portion 20 can comprise vertical divider components 28 forming inner walls of the plurality of separated feeding compartments 26. Hopper component 30 (FIG. 5) can comprise recessed portions 60 disposed between the plurality of separated hopper compartments 34 and configured to slidingly engage the vertical divider components 28 of the base 20, wherein the hopper component 30 is configured to nest within the base 20 and hold a feedstuff, e.g. feed or mineral supplement. Each hopper component 30 can comprise a first opening 144 at a top end 38, wherein the hopper component 30 can comprise a plurality of substantially vertical sides 32, wherein the first opening at top end 38 and plurality of substantially vertical sides 32 define an interior space 36 configured to hold a feedstuff. A plurality of separated hopper compartments 34 can extend below interior space 36 of hopper component 30. The plurality of separated hopper compartments 34 can in some aspects be defined by a plurality of side walls 142 extending from the plurality of substantially vertical sides 32 of the hopper component 30, and the recessed portions 60 disposed between the separated hopper compartments 34. As shown in FIG. 5, for example, the plurality of side walls 142 of the plurality of separated hopper compartments 34 extend substantially vertically and inwardly tapered from the plurality of substantially vertical sides 32 of the hopper component 30. The interior space 36 of the hopper component 30 can extend into an interior space of each of the separated hopper compartments 34 as shown in FIG. 12.

As shown in FIG. 5, each of the plurality of separated hopper compartments 34 terminates in a second opening 66, defined by a lower terminal end 64 of each of the separated hopper compartments 34, which can then, when in an assembled condition (FIG. 3), feed into the one or more feeding compartments 26 of base portion 20. Hopper compartments 34 are configured to hold a feedstuff, wherein the feedstuff is gravity fed into the one or more feeding compartments 26 in the base 20.

Figure 8:
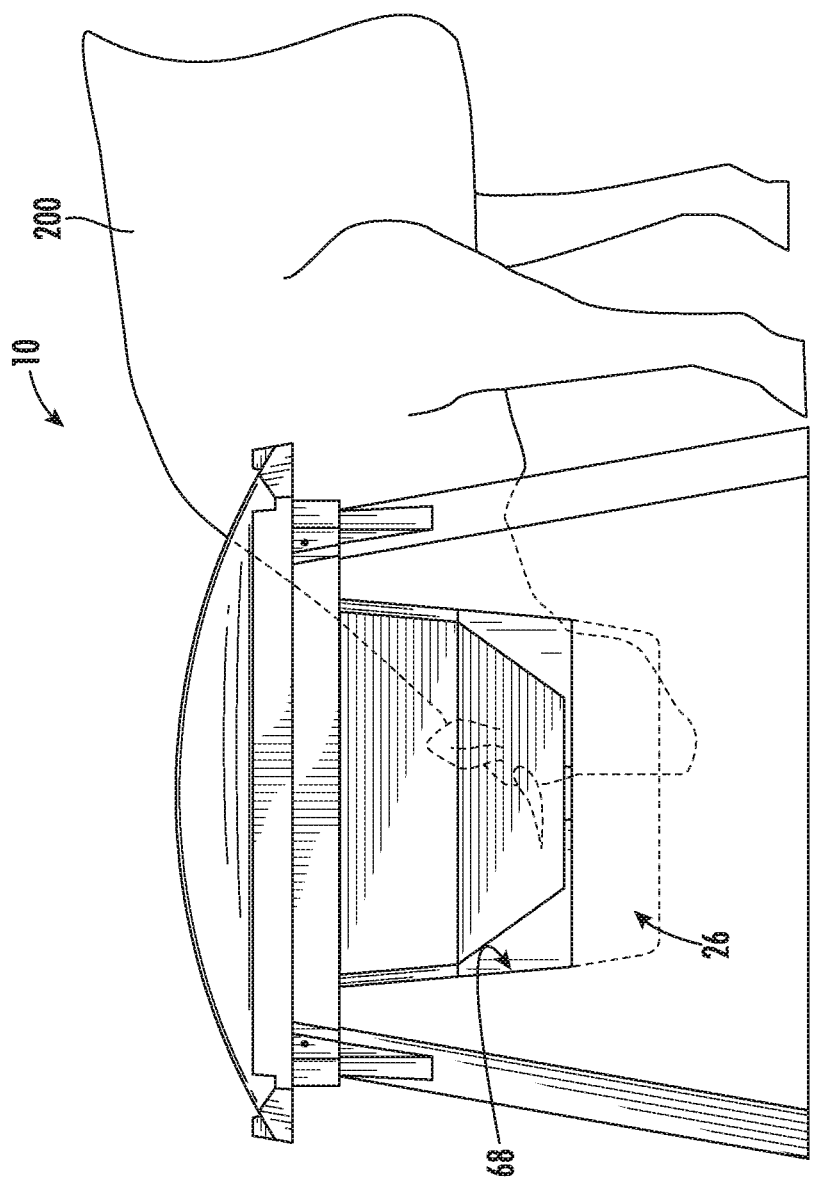
FIG. 8 is a front elevation view of a livestock feeder in use and in accordance with the subject matter herein.

In FIGS. 1 and 4, feeding compartments 26 in base 20 are configured to receive a feedstuff from hopper compartments 34 by gravity flow. Hopper 30 is configured to keep the feedstuff dry and away from environmental elements. Only when the feedstuff feeds into feeding compartments 26 is it potentially exposed to weather. The feedstuff is then accessed by an animal via access opening 68. See FIG. 8. Feeding compartments 26 can comprise interior sides or inner walls formed by divider components 28 and a lower floor 72 forming a pan or feed trough. In some aspects, one or more sides or walls of the feeding compartments 26, or floor 72, can comprise a steep angle to prevent loss of contents/feedstuffs from feeding compartments 26 (FIG. 4). In some aspects, the feeding compartments 26, or pans, can be substantially "U" shaped. In some aspects, the feeding compartments 26 can comprises a plurality of separate sections configured to allow a plurality of different supplements or feedstuffs without cross contamination. See, e.g. four separate sections in FIG. 4.

Figure 6A:
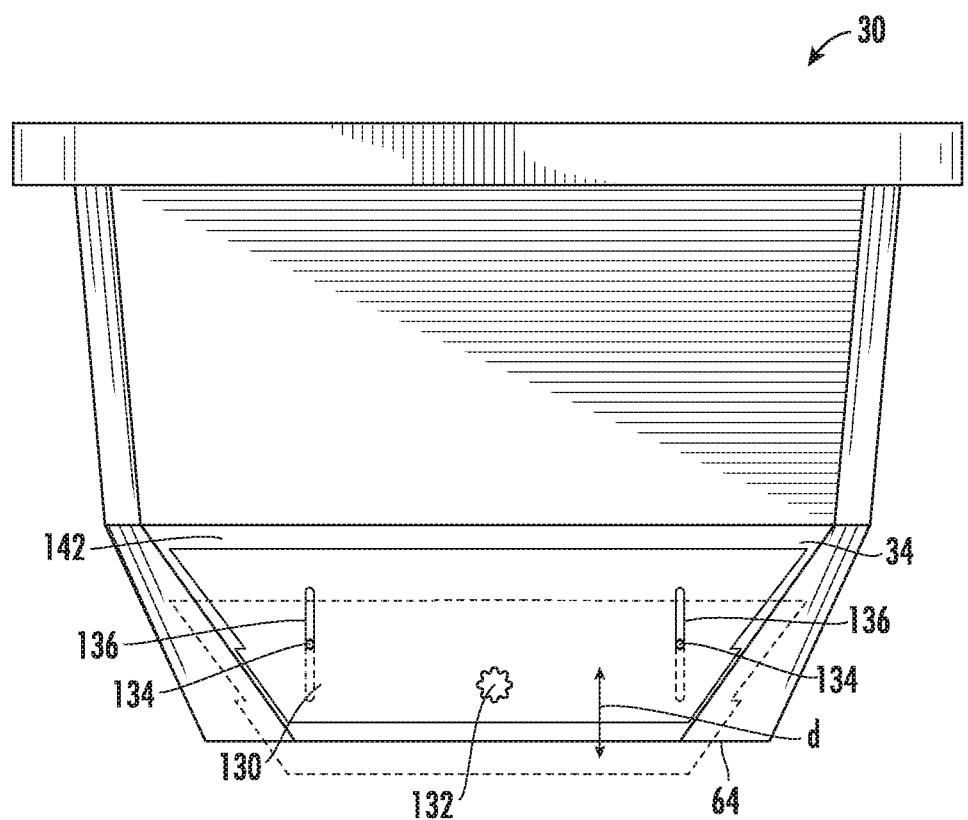
FIG. 6A is a front elevation view of a hopper component with adjustable door of a livestock feeder in accordance with the subject matter herein.
Figure 6B:
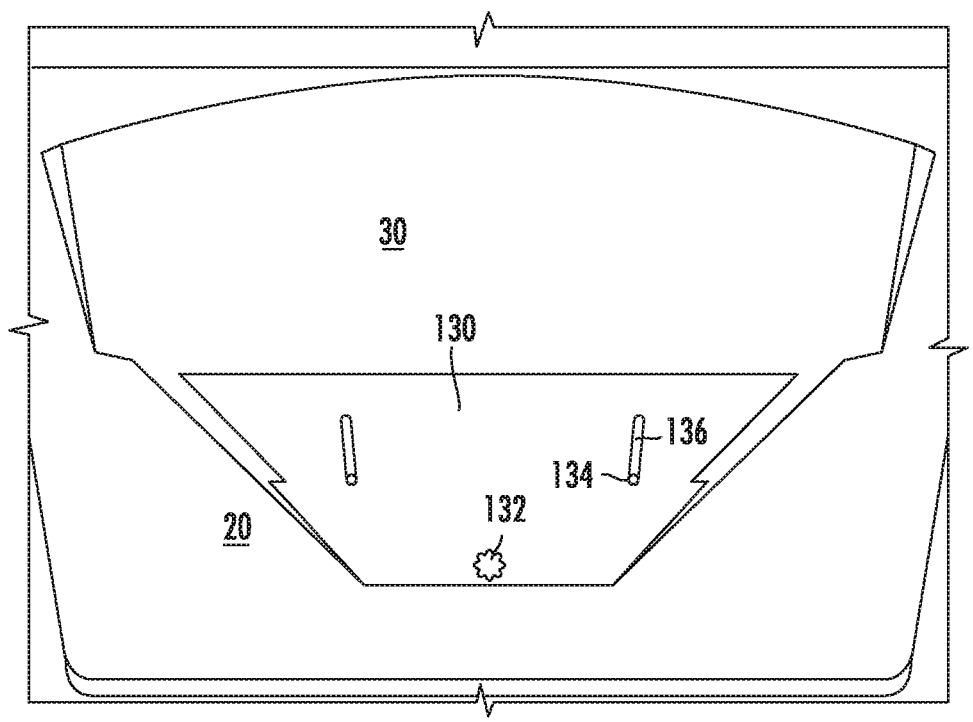
FIG. 6B is a close-up view of the adjustable door on the hopper component of FIG. 6A.
Figure 7:
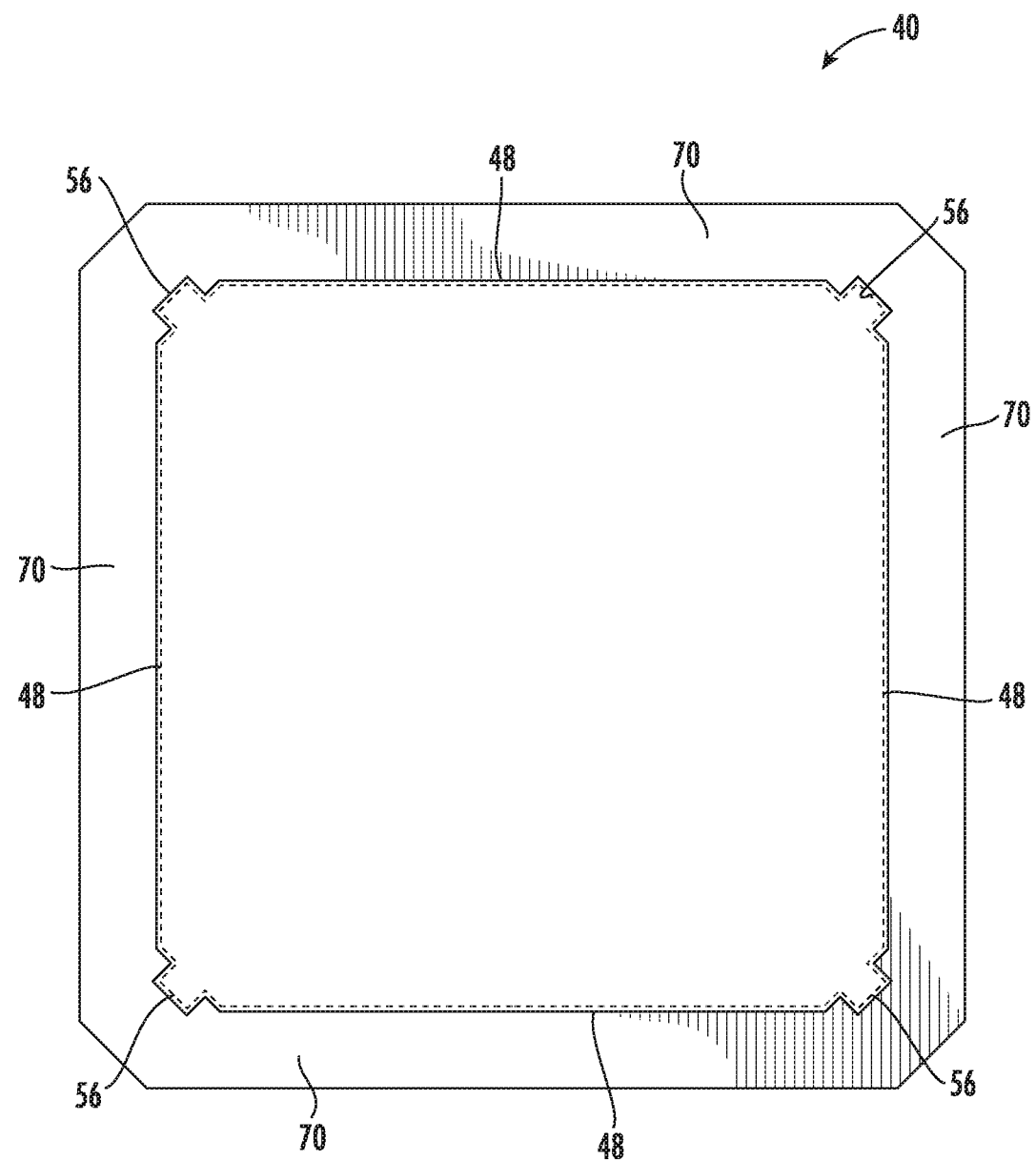
FIG. 7 is a bottom plan view of a lid component of a livestock feeder in accordance with the subject matter herein.

Turning now to FIGS. 6A and 6B, in some aspects, the hopper component 30 comprises one or more adjustable doors 130. Adjustable doors 130 can control the flow of feedstuffs from a hopper compartment 34 to a feeding compartment 26. In some aspects, the one or more adjustable doors 130 can be adjustably affixed to at least one of the plurality of separated hopper compartments 34. As shown in FIG. 6A, such adjustable door 130 can be affixed to an outer wall 142 of the hopper compartment 34 using fastener 134. Fastener 134 can be any suitable fastener, e.g. bolt, screw, rivet, etc. In some aspects, fastener 134 can pass through a slot 136 in adjustable door 130 and affix on an interior of an outer wall 142 of hopper compartment 34. In some embodiments, fastener 134 can comprise a spring or other tension device suitable for applying a tension to the fastener 134 to hold the adjustable 130 door in place. Adjustable door 130 can slide up or down in a substantially vertical direction d to increase or decrease the flow of feedstuff from hopper compartment 34. Slot 136 can allow for adjustable door 130 to be slidably manipulated with respect to outer wall 142 of hopper compartment 34. In some aspects, a knob 132 or handle can be present on adjustable door 130 to allow a user to securely grip and adjust the adjustable door 130 to a desired location (see, e.g. close-up view in FIG. 6B). When in an installed and usable condition adjustable doors 130 on one or more of the separated hopper compartments 34 can be configured to control the flow of feedstuffs from the hopper 30 to the adjoining feeding compartment 26. Moreover, adjustable doors 130 can be closed when feeder 10 is being moved or transported so that the flow of feedstuff from the hopper is stopped, whereby spillage of feedstuff during transport is minimized or prevented.

Lid component 40 can be detachably secured to one or more of the plurality of upright support posts 24. In some aspects, as shown in FIGS. 1, 2 4 and 7, lid component 40 can comprise a solid top 42 or cover, wherein the lid component 40 aligns with and/or is secured to base portion 20 by an interacting slot 56 in an underside shoulder 48 of lid component 40 and one or more ribs 52 on one or more of the plurality of upright support posts 24. Slot 56 can be configured to sliding engage rib 52 when lid component 40 is lowered onto base portion 20. A hole 58 in slot 56 can align with a hole 54 in rib 52 to thereby allow a securing mechanism, such as a pin, bolt, screw or the like, to secure lid component 40 to base portion 20.

Lid component 40 comprises a solid top 42 with a downward sloping curvature or upper dome from a centermost point, wherein the lid component 40 comprises a lip 44 extending substantially around an outermost edge. See FIGS. 1, 2 and 3. In some aspects, lip of the lid component 40 extends substantially vertically from the outermost edge of the lid component 40 and is configured to direct water, i.e. act as a gutter, to one or more corners or channels 46 of lid 40. Such a configuration can direct rain water and other elements away from access openings 68. Moreover, in some embodiments lid component 40 can comprise an overhang 70 (best shown in FIG. 7) that extends over access opening 68 of base 20 when in an assembled condition (see FIG. 3).

Figure 9:
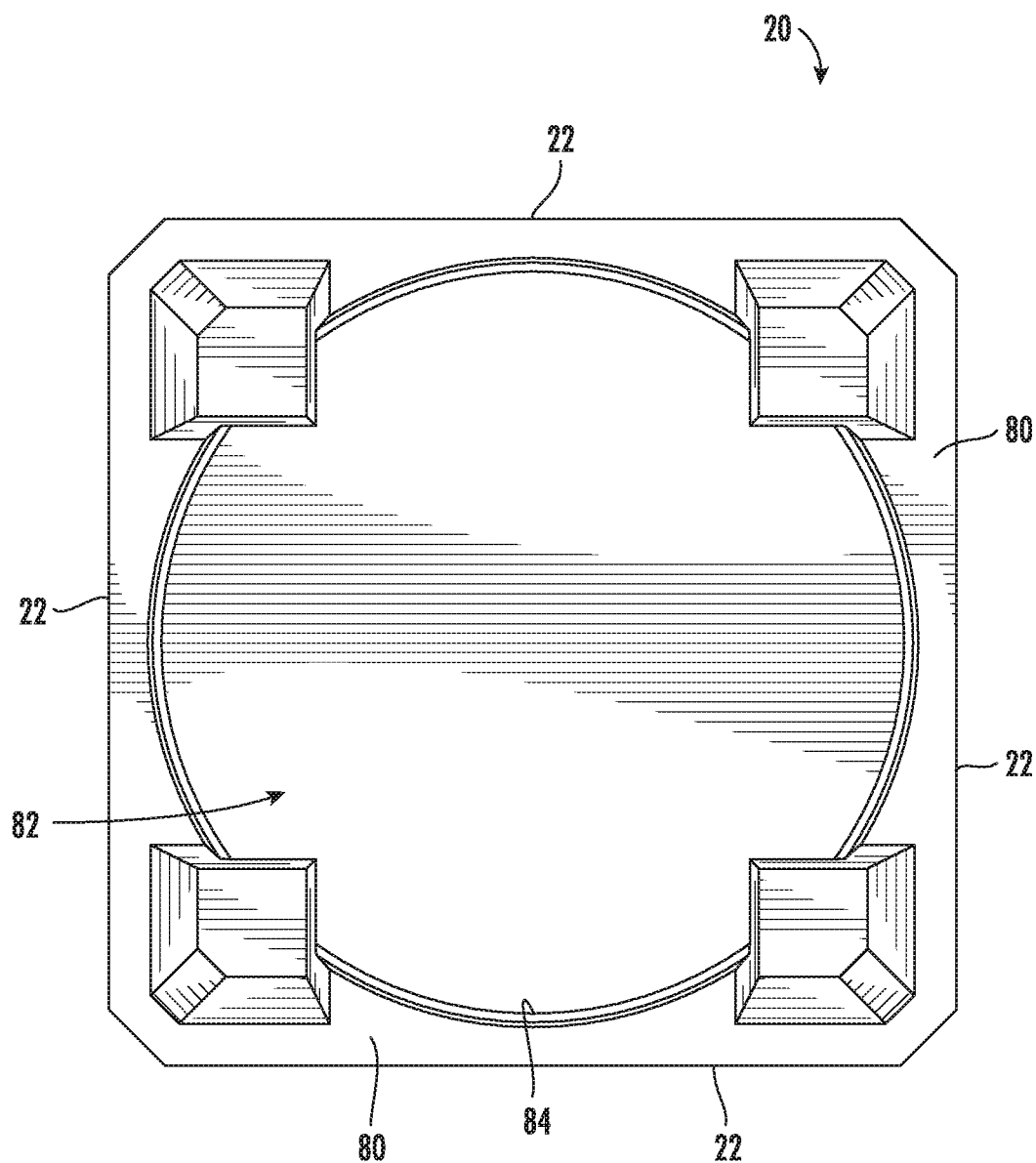
FIG. 9 is a bottom plan view of a base portion of a livestock feeder in accordance with the subject matter herein.
Figure 10:
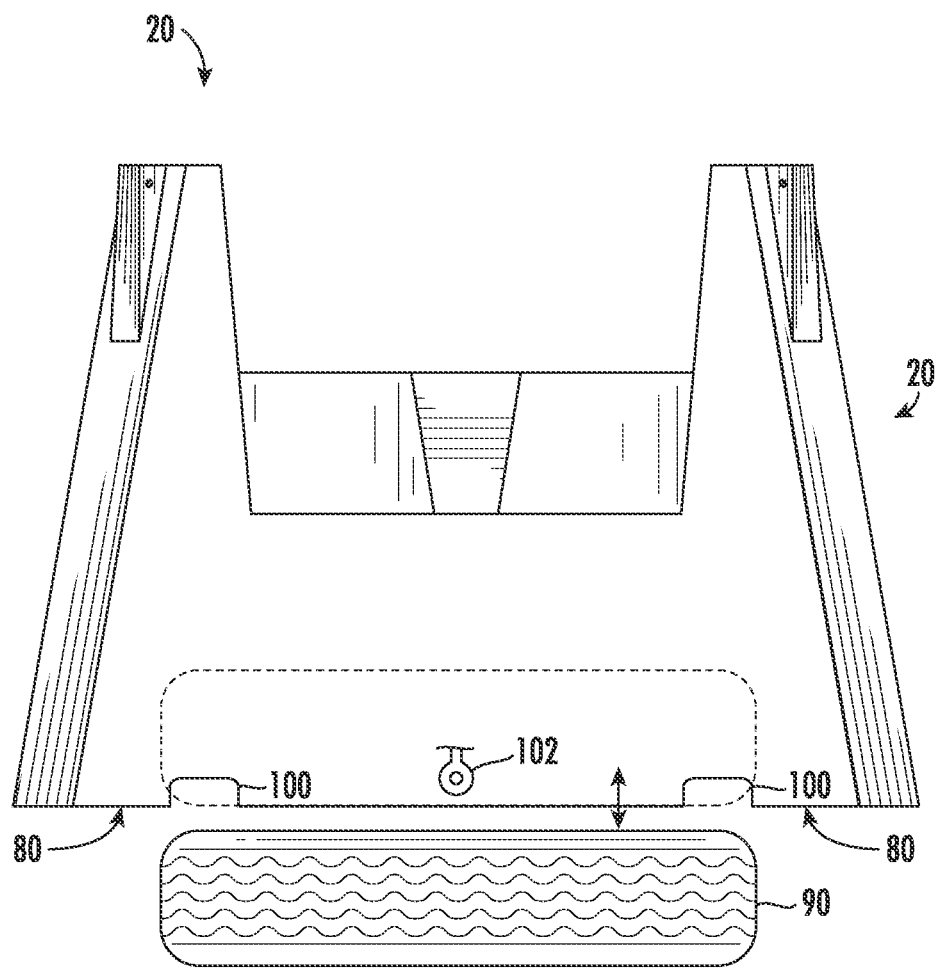
FIG. 10 is a front elevation view of a livestock feeder with optional tire as a base in accordance with the subject matter herein.

Turning now to FIGS. 9 and 10, in some aspects livestock feeder 10 can comprise a base portion 20 with a recessed cavity 82 formed by a circular (or other suitable shape) wall 84 on an underside 80 of base portion 20. As would be appreciated by one of ordinary skill in the art, mineral feeders and the like can often be tipped over, pushed around and knocked about by livestock when the animals are using the feeder. The force applied by the animals can result in spillage of the feedstuffs therein and/or damage to the feeder itself. Nutritional supplements and other feedstuffs intended to be used in a feeder 10 of the presently disclosed subject matter can be costly. Thus, a feeder that can prevent or minimize spillage and waste is important for cost-effective livestock production. Moreover, a feeder that cannot withstand the forces applied by the animals will not only shorten the useful lifespan of the feeder, but may present a risk of harm to the animals themselves. Further, bulls, for example, can be particularly harmful to feeders due to their size, strength and more aggressive behavior. Thus, a feeder 10 as disclosed herein is designed to be durable, maintain and upright position when in use by livestock, and prevent or reduce spillage of the feedstuffs. That is, the feeder 10 is designed to be "bull-proof".

In particular, a feeder 10 as disclosed herein, particularly including optional tire 90 or other weighted element can provide for a feeder that is less likely to tip over and more likely to maintain an upright position upon the application of force by livestock. The increased stability provided by the design of base 20 minimizes, reduces or prevents spillage and waste of the feedstuffs, and increases the durability and longevity of the feeder 10 as compared to other feeder designs.

Recessed cavity 82 can in some aspects have a circular opening with a diameter substantially similar to the diameter of the outer periphery of a tire 90. Recessed cavity 82 of the base 20 is configured to receive a tire, wherein the base is configured to rest on the tire, wherein the base portion 20, particularly with a tire 90 or other weighted element, acts as an anti-tipping mechanism to maintain the feeder in an upright position upon the application of force by livestock. Tire 90 or other weighted element adds both weight to feeder 10 and frictional contact with the surface of the ground. The added weight and friction prevents or minimizes feeder 10 from being tipped over and/or pushed around by the livestock.

While the recessed cavity 82 of base 20 can include a variety of large heavy objects, tires, particularly used tires, can prove to be useful due to the fact that they not only provide weight but provide good frictional contact with the ground, thereby stabilizing the feeder 10 so as to prevent sliding and tipping over. Moreover, feeder 10 has been designed to be suitable for use with used tires as the weighted object in an effort to provide an environmentally friendly aspect, i.e. "green" feature, by repurposing discarded and otherwise unusable tires so as to prevent such tires from entering the landfill systems. This aspect may prove to be especially beneficial to organic and/or environmentally sustainable farming and agricultural operations.

By way of example and not limitation, 24.5 inch tires (24.5 inches represents the inner diameter or wheel size of the tire) can be used as tire 90 since they are a common size and widely used on many farming and agricultural operations. For example, a 24.5 inch tire could be used with a feeder 10 having a diameter of about 20 inches to about 24 inches. Likewise, 22.5 inch tires (22.5 inches represents the inner diameter or wheel size of the tire) can be used since they are also a common size and widely used on many farming and agricultural operations. For example, a 22.5 inch tire could be used with feeder 10 having a diameter of about 18 inches to about 22 inches. In some aspects, 15 or 16 inch tires can be used. One of ordinary skill in the art will appreciate that virtually any size tire can be used.

In some aspects, the disclosed livestock feeder can be portable. For example, the feeder can be towed or dragged by a person or vehicle. As shown in FIG. 10, an attachment point 102 can be provided, extending from a side of the feeder as shown in FIG. 10, or extending through one of the T-slots, or extending from tire 90, to allow the feeder to be dragged by securing a towing mechanism, e.g. a tow rope or chain. As shown, attachment point 102 can comprise an eye-bolt, eyelet, hook or coupling secured to the outer wall of base 20, or can alternatively be secured to tire 90 if such is placed in the recessed cavity. The attachment point 102 can be attached to base 20 using a bolt, screw or other fastening device as would be appreciated by one of ordinary skill in the art. Due to the increased stability afforded by a tire 90, feeder 10 can be moved from one location to another by pushing or pulling the feeder 10. Alternatively, tire 90 can also improve portability as the feeder can rest on the tire which can allow the feeder to be moved easily while sliding on the ground on the tire. The portability of the feeder can be advantageous where it is used in a rotational grazing program where the livestock are often moved from one paddock or pasture to another. Frequent feeder movement can also prevent pasture damage during wet weather.

As shown in FIG. 10, in some embodiments and optional feature can comprises slots 100, or "T-slots" on an underside 80 of base 20 configured to allow portability with a fork lift. In some aspects, underside 80 of base 20 can comprise rounded and/or curved edges on a lower surface to allow for dragging or moving across the ground surface during portability. In some aspects, one or more portions of such a feeder, e.g. lower floor 72 of feeding compartment 26, can further comprise drain holes to drain rain water and snow/ice melt.

Figure 11:
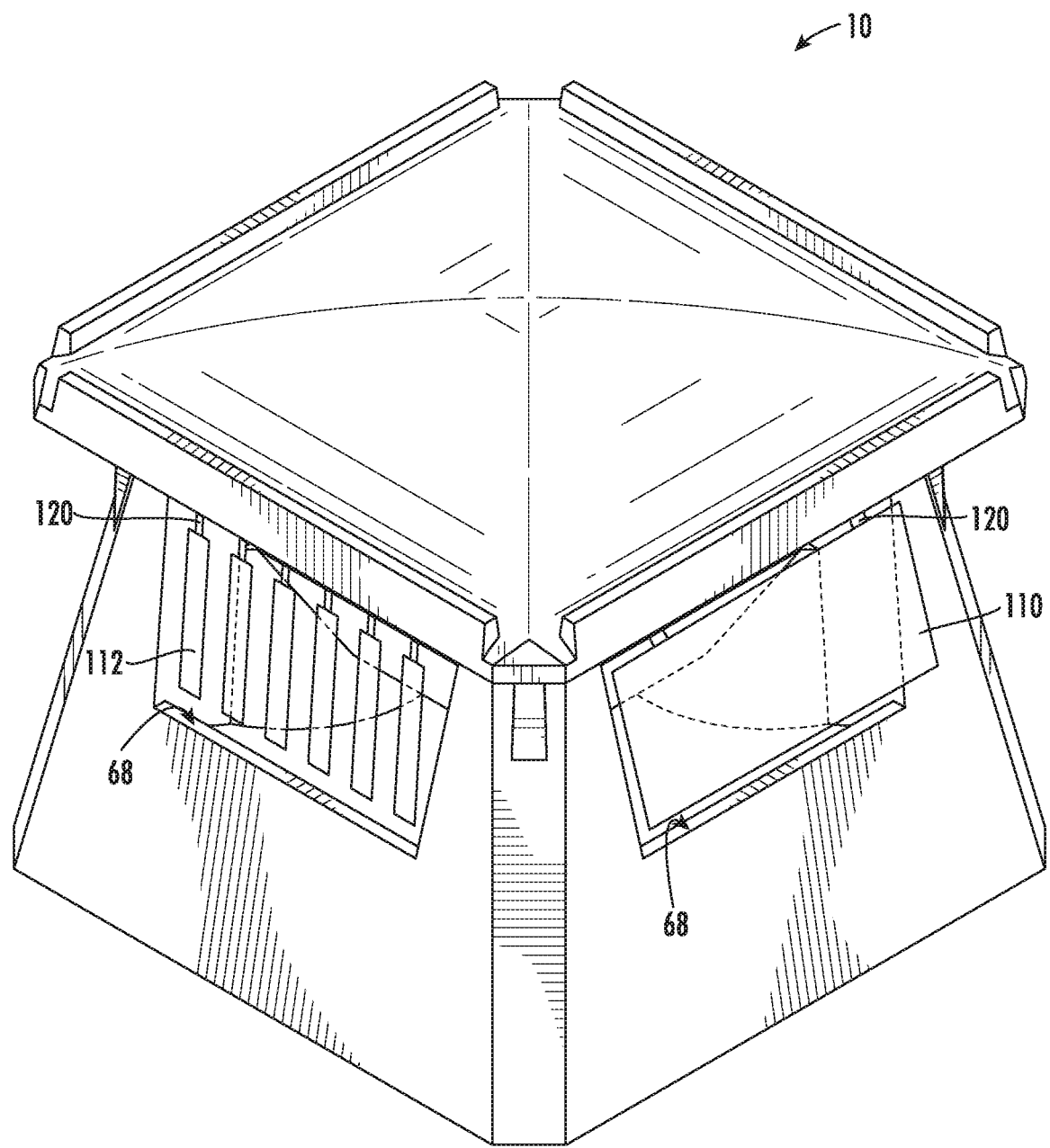
FIG. 11 is a perspective view of a livestock feeder with optional insecticidal strips in accordance with the subject matter herein.

As illustrated in FIG. 11, feeder 10 can further comprise one or more insecticide applicators 110/112. Insecticide applicators 110/112, such as anti-parasite impregnated strips or flaps, or "dust bags" or "fly bullets", can be used to apply insecticides or insect repellants to an animal while the animal is using the feeder 10. One or more insecticide applicators 110/112 can be positioned at or near access opening 68 of the feeder 10 so that the animal will come into contact with the insecticide applicators 110/112 upon accessing the feeder 10 through access opening 68. When the animal brushes up against the insecticide applicators 110/112 the insecticide, usually in a powder or liquid form, will rub off on the animal. For example, one or more insecticide applicators can be secured near the top of opening 68, or on the bottom side of overhang 70 of lid 40, as illustrated in FIG. 11. The insecticide applicators 110/112 can be secured to feeder 10 using a fastening device 120, such as a hook, bolt, screw, ring, snap, rivet or other fastening device. As illustrated in FIG. 11, insecticide applicators 110/112 can comprise a flap or sheet 110 or a plurality of strips 112.

Additionally, as illustrated in FIG. 11, feeder 10 can further comprise a flap 110 substantially covering opening 68. Flap 110, in addition to, and/or in lieu of acting as an insecticide applicator, can prevent, reduce or minimize precipitation from entering opening 68 to thereby keep feedstuffs in feeding compartment 26 dry. Flap 110 can be affixed or attached to top of opening 68, or on the bottom side or outer edge of overhang 70 of lid 40, using bolts, screws, grommets, snaps or the like. Flap 110 can be removable and/or replaceable. Flap 110 can comprise a single sheet of material or multiple strips of material. By way of example and not limitation, flap 110 can be made of a plastic material, rubber material, cloth material, or the like. Flap 110 can be constructed of a UV-resistant material. Flap 110 can be a clear, opaque or tinted material. Flap 110 can be designed to allow livestock ready access to the feedstuffs in feeder 10 while protecting the feedstuffs from environmental elements.

FIG. 12 shows an optional hopper 30 feature comprising a divider 150. Divider 150 comprises perpendicular cross members comprising substantially planar panels configured to rest on recessed members 60 and centermost point 140 of hopper 30. Divider 150 is removable. Divider 150 is configured to extend the holding capacity of separated hopper compartments 34 into hopper 30 such that feedstuffs can be separated into one or more of the four compartments. Such a configuration can allow multiple feedstuffs to be offered in the same feeder while keep the same separate to avoid cross-contamination.

Turning now to FIG. 13, although FIGS. 1-12 illustrate a feeder 10 with a total of four access openings 68 and four corresponding feeding compartments 26, the present disclosed feeding systems can comprise any number of openings and feeding compartments, as shown in FIG. 13. For example, feeder 210 can comprise a base 220, a top 240, multiple hoppers 230 and two or more access openings/feeding compartments on each side. Such a configuration can therefore comprise two feeding compartments on each side for a total of eight. Alternatively, such a feeder 210 can have three, four or more feeding compartments on each side. Moreover, in some embodiments, a feeder 210 can have two, three, four, or more feeding compartments on each side, while having fewer, e.g. zero, one, two, three or four feeding compartments on the ends. As one of ordinary skill in the art will appreciate, the number of feeding stations and/or hoppers can be varied without departing from the scope of the present disclosure.

In some aspects, the base portion 20, hopper component 30 and/or lid component 40 can be constructed as molded composites comprising a polyethylene material. The polyethylene material can be UV resistant. The polyethylene material resists corrosion. Likewise, each piece, e.g., base, hopper and top, can be molded from any number of moldable materials. The thickness of the sides, top and bottom of each component can range from about 0.25 inches to about 2.0 inches. In some aspects, the feeders 10 and components thereof can be molded from a plastic material or plastic compound. As would be appreciated by one of ordinary skill in the art, a feeder 10 can be constructed of any other polymer or copolymer without departing from the scope of the instant application. By using a UV-resistant material the durability and lifespan of a feeder 10 can be substantially increased, particularly since such feeders are often used outdoors with significant exposure to UV radiation from sunlight. Moreover, a feeder 10 can be constructed of a material, e.g., polyethylene, that resists corrosion. The use of a corrosion-resistant material can substantially increase the durability and lifespan of a feeder 10. The non-corrosive material also makes the feeder 10 virtually maintenance free. The material and construction of feeder 10 also makes feeder 10 safe for use by animals, with no parts for animals to become entangled in or injured by.

The design and height of the feeder 10 makes it useful for all types of livestock, particularly grazing livestock since the downward motion of the head of the animal during use of the feeder 10 closely resembles the natural grazing position of the head while grazing. Moreover, the height of the access openings and feeding compartments (or pans) allows all sizes of livestock to access the feeder, from small sheep and goats to mature bulls. The livestock feeder 10 disclosed herein is suitable for use by any livestock species of any age or size, including but not limited to cattle, sheep, goats, horses, mules, donkeys, bison, alpacas, llamas, deer, elk, exotic animals, zoo animals, game animals, and wildlife animals.

The feeder 10 is suitable for providing any type of feedstuff to an animal, including but not limited to granular feedstuffs, loose feedstuffs, ground feedstuffs, pelleted feedstuffs, cubed feedstuffs, liquid feedstuffs, paste feedstuffs or feedstuffs in compressed block form. Furthermore, feeder 10 as disclosed herein is suitable for providing to livestock animals any kind of nutritional component or nutritional supplement, including but not limited to supplements, mineral supplements, vitamin supplements, protein supplements, energy supplements, medicated supplements, growth-promoting compounds, estrous synchronization compounds, pro-biotic compounds, pre-biotic compounds, salts, or combinations thereof. These types of feedstuffs are often provided in a container, bag, sack, bucket, or in bulk, each of which can be dumped, poured, or placed in hopper 30 by a user.

As would be appreciated by one of ordinary skill in the art, the size of the feeder can vary depending on the intended use, without departing from the scope of the instant disclosure. By way of example and not limitation, feeder 10 (FIGS. 1-3) can be about 25 inches to about 50 inches tall, about 20 inches to about 120 inches in wide, and wherein each of the access openings 68 about 15 inches to about 20 inches in wide and about 15 inches to about 20 inches in high. The plurality of separated feeding compartments 26 can be about 10 inches to about 20 inches deep, and about 10 to about 20 inches in diameter. By way of example and not limitation, a quad feeder with one access opening on each side could be about 48 inches wide, 48 inches long, and about 40 inches tall. A feeder that has multiple access openings on each side could be about 96 to about 120 inches long. Each of the feeding compartments can have an inner receptacle suitable for receiving and containing from about 1 pound to about 300 pounds of feedstuff. Each feeder can hold from about 650 to about 1500 pounds of feedstuff.

One advantage of the disclosed feeder design is the feed holding capacity. By way of example and not limitation, feeders as disclosed herein can have a capacity of about 650 pounds or more of feedstuff. Moreover, given the plurality of access openings and feeding compartments, e.g. 4, 8, 12, etc., multiple animals can feed simultaneously, which is particularly advantageous in large herds.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A livestock feeder comprising:
    a base portion comprising a plurality of separated feeding compartments radiating from a centermost point, wherein the base portion further comprises a recessed circular portion on an underside thereof having a circular opening with a diameter substantially similar to the diameter of the outer periphery of a tire;
    a hopper component comprising a plurality of separated hopper compartments radiating from a centermost point and corresponding to the plurality of separated feeding compartments; and
    a lid component comprising a substantially planar member positioned above the base portion and/or hopper component.

2. The livestock feeder of claim 1, wherein the base portion comprises a plurality of access openings adjacent to each of the plurality of separated feeding compartments, wherein each of the plurality of access openings are of a size sufficient to permit livestock to access each of the separated feeding compartments by passing an animal head therethrough.

3. The livestock feeder of claim 1, wherein the base portion comprises vertical divider components forming inner walls of the plurality of separated feeding components.

4. The livestock feeder of claim 1, wherein the one or more hopper compartments are configured to hold a feedstuff, wherein the feedstuff is gravity fed into the one or more feeding compartments in the base.

5. The livestock feeder of claim 1, further comprising a divider insertable in the hopper component and extending above the plurality of separated hopper compartments.

6. The livestock feeder of claim 1, wherein the recessed circular portion of the base is configured to receive a tire, wherein the base is configured to rest on the tire, wherein the base portion is an anti-tipping mechanism to maintain the feeder in an upright position, wherein the tire improves portability.

7. The livestock feeder of claim 1, wherein the base portion, hopper component and lid component are constructed as molded composites comprising a polyethylene material.

8. The livestock feeder of claim 1, wherein the base portion further comprises a plurality of upright support posts configured to engage and support the hopper component and/or the lid component.

9. The livestock feeder of claim 6, wherein hopper component and/or the lid component aligns with and is supported by the upright support posts.

10. The livestock feeder of claim 8, wherein the lid component is detachably secured to one or more of the plurality of upright support posts, wherein the lid component comprises a downward sloping curvature from a centermost point, wherein the lid component comprises a lip extending substantially around an outermost edge.

11. The livestock feeder of claim 1, wherein the hopper component comprises recessed portions disposed between the plurality of separated hopper compartments and configured to slidingly engage the vertical divider components of the base, wherein the hopper component is configured to nest within the base and hold feed or mineral.

12. The livestock feeder of claim 11, wherein the hopper component comprises a first opening at a top end, wherein the hopper component comprises a plurality of substantially vertical sides, wherein the first opening and plurality of substantially vertical sides define an interior space configured to hold a feedstuff.

13. The livestock feeder of claim 12, wherein the plurality of separated hopper compartments extend below the interior space of the hopper component, wherein the plurality of separated hopper compartments are defined by a plurality of side walls extending from the plurality of substantially vertical sides of the hopper component and the recessed portions disposed between the separated hopper compartments.

14. The livestock feeder of claim 13, wherein the plurality of side walls of the plurality of separated hopper components extend substantially vertically and inwardly tapered from the plurality of substantially vertical sides of the hopper component.

15. The livestock feeder of claim 14, wherein each of the plurality of separated hopper components terminates in a second opening.

16. The livestock feeder of claim 1, wherein the hopper component comprises one or more adjustable doors.

17. The livestock feeder of claim 16, wherein the one or more adjustable doors is adjustably affixed to at least one of the plurality of separated hopper compartments, wherein the adjustable doors are configured to control the flow of feedstuffs from the hopper compartment to the adjoining feeding compartment.

18. The livestock feeder of claim 17, wherein the one or more adjustable doors comprise one or more slots and one or more adjustable attachment components, wherein the one or more adjustable doors are configured to slidably attach to at least one of the side walls of the plurality of separated hopper components, wherein the one or more adjustable doors are configured to slidable move in a substantially vertical direction with respect to the side wall of the separated hopper component to thereby change a dimension of the second opening.

19. A livestock feeder system comprising:
a base portion comprising a plurality of separated feeding compartments radiating from a centermost point, wherein the base is configured to rest on a tire, wherein the base portion is an anti-tipping mechanism to maintain the feeder in an upright position;
a hopper component comprising a plurality of separated hopper compartments radiating from a centermost point and corresponding to the plurality of separated feeding compartments, wherein the hopper component comprises one or more adjustable doors, wherein the adjustable doors are configured to control the flow of feedstuffs from the hopper compartment to the adjoining feeding compartment; and
a lid component comprising a substantially planar member positioned above the base portion and/or hopper component.

\* \* \* \* \*